(12) United States Patent
Wada

(10) Patent No.: US 11,273,755 B2
(45) Date of Patent: Mar. 15, 2022

(54) LIGHT OUTPUT APPARATUS FOR VEHICLE, LIGHT OUTPUT METHOD, AND NON-TRANSITORY COMPUTER READABLE MEDIUM

(71) Applicant: JVCKENWOOD CORPORATION, Yokohama (JP)

(72) Inventor: Yuki Wada, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/158,576

(22) Filed: Jan. 26, 2021

(65) Prior Publication Data

US 2021/0146828 A1    May 20, 2021

Related U.S. Application Data

(63) Continuation of application No. PCT/JP2019/009191, filed on Mar. 7, 2019.

(30) Foreign Application Priority Data

Sep. 4, 2018 (JP) .............................. JP2018-165206

(51) Int. Cl.
  *B60Q 1/34* (2006.01)
  *B60Q 1/44* (2006.01)

(52) U.S. Cl.
  CPC ................. *B60Q 1/34* (2013.01); *B60Q 1/44* (2013.01); *B60Q 2400/50* (2013.01)

(58) Field of Classification Search
  CPC ........ B60Q 1/34; B60Q 1/44; B60Q 2400/50; B60Q 1/2607; B60Q 1/503; B60Q 1/085; B60Q 1/50; B60Q 1/24; B60Q 1/26; B60Q 1/2261; F21S 43/16; F21S 43/26;

(Continued)

(56) References Cited

U.S. PATENT DOCUMENTS 7,287,884 B2 * 10/2007 Koike .................... B60Q 1/484
  362/464
8,325,027 B2 * 12/2012 Tee .......................... B62J 6/056
  340/432

(Continued)

FOREIGN PATENT DOCUMENTS

WO      2016/114048 A1    7/2016

*Primary Examiner* — Eric Blount
(74) *Attorney, Agent, or Firm* — Procopio, Cory, Hargreaves & Savitch LLP

(57) ABSTRACT

A light output apparatus for vehicle according to an embodiment includes a transmission member disposed on an outer-surface side of a vehicle, the transmission member being adapted to let visible light pass therethrough, and to receive ultraviolet light and emit light by itself. The apparatus scans a visible light laser and an ultraviolet light laser, and projects the visible light laser and the ultraviolet light laser onto the transmission member. The apparatus performs control, based on vehicle information about the vehicle, to show first information by projecting the ultraviolet light laser onto the transmission member and thereby making the transmission member emit light, and to project the visible light laser onto the transmission member and thereby project second information onto a surface which the visible light laser reaches after passing through the transmission member.

8 Claims, 5 Drawing Sheets

(58) Field of Classification Search
CPC ............... G08G 1/16; B60K 2370/334; B60K 2370/165; B60K 2370/797
USPC ............ 340/435, 555, 557, 815.4, 901, 982; 353/12, 13; 362/259, 509
See application file for complete search history.

(56) References Cited

U.S. PATENT DOCUMENTS

| | | | | |
|---|---|---|---|---|
| 8,547,298 | B2* | 10/2013 | Szczerba | G01S 13/867 |
| | | | | 345/7 |
| 10,093,224 | B2* | 10/2018 | Kim | G03B 21/147 |
| 10,479,269 | B2* | 11/2019 | Kim | B60Q 1/525 |
| 10,821,878 | B2* | 11/2020 | Nakashima | F21S 41/125 |
| 10,953,789 | B2* | 3/2021 | Salter | B60Q 1/50 |
| 11,117,535 | B2* | 9/2021 | Potter | B60R 25/24 |
| 2017/0038458 | A1* | 2/2017 | Sugawara | G01S 7/4817 |
| 2018/0004020 | A1 | 1/2018 | Kunii et al. | |
| 2018/0024359 | A1* | 1/2018 | Yoneyama | B60K 35/00 |
| | | | | 345/9 |
| 2018/0154819 | A1* | 6/2018 | Hoshino | B60Q 1/50 |
| 2018/0297470 | A1* | 10/2018 | Kim | B60K 35/00 |
| 2019/0104285 | A1* | 4/2019 | Medvec | H04N 9/3161 |

\* cited by examiner

LIGHT OUTPUT APPARATUS FOR VEHICLE, LIGHT OUTPUT METHOD, AND NON-TRANSITORY COMPUTER READABLE MEDIUM

CROSS REFERENCE TO RELATED APPLICATION

This application is a Bypass Continuation of PCT/JP2019/009191 filed on Mar. 7, 2019, which is based upon and claims the benefit of priority from Japanese patent application No. 2018-165206, filed on Sep. 4, 2018, the disclosure of which is incorporated herein in its entirety by reference.

BACKGROUND

The present invention relates to a light output apparatus for vehicle, a light output method, and a program.

Conventionally, a technique for informing a pedestrian of information such as a message by projecting light onto a road surface or the like around an automobile has been known. For example, International Patent Publication No. WO2016/114048 discloses a video projection apparatus that projects a video from a vehicle onto a road surface.

SUMMARY

However, various lighting apparatuses are already installed in an automobile. Therefore, if a projection apparatus such as the video projection apparatus disclosed in International Patent Publication No. WO2016/114048 is provided in such an automobile in addition to these lighting apparatuses, the space in which these apparatuses are installed and the weight of the vehicle as well as the power consumption thereof increase. Therefore, for such a projection apparatus which is provided in a vehicle and projects information onto a road surface or the like, it has been desired to reduce its weight and its installation space in the vehicle.

A light output apparatus for vehicle according to an embodiment includes: a light source unit configured to emit a visible light laser and an ultraviolet light laser; a scanning unit configured to scan the visible light laser and the ultraviolet light laser emitted from the light source unit; a control unit configured to control the light source unit and the scanning unit; and a transmission member disposed on an outer-surface side of a vehicle, the transmission member being adapted to let visible light pass therethrough, and to receive ultraviolet light and emit light by itself, in which the scanning unit scans the visible light laser and the ultraviolet light laser, and projects the visible light laser and the ultraviolet light laser onto the transmission member, and the control unit performs control, based on vehicle information about the vehicle, to show first information by projecting the ultraviolet light laser onto the transmission member and thereby making the transmission member emit light, and to project the visible light laser onto the transmission member and thereby project second information onto a surface which the visible light laser reaches after passing through the transmission member.

A light output method according to an embodiment is a light output method performed in a light output apparatus for vehicle, the light output apparatus for vehicle including: a light source unit configured to emit a visible light laser and an ultraviolet light laser; and a transmission member disposed on an outer-surface side of a vehicle, the transmission member being adapted to let visible light pass therethrough, and to receive ultraviolet light and emit light by itself, the light output method including: an input step of receiving vehicle information about the vehicle; and a projection step of scanning the visible light laser and the ultraviolet light laser, and projecting the visible light laser and the ultraviolet light laser onto the transmission member, in which in the projection step, based on the vehicle information input in the input step, first information is shown by projecting the ultraviolet light laser onto the transmission member and thereby making the transmission member emit light, and the visible light laser is projected onto the transmission member and second information is thereby projected onto a surface which the visible light laser reaches after passing through the transmission member.

A program according to an embodiment is a program for a light output apparatus for vehicle, the light output apparatus for vehicle including: a light source unit configured to emit a visible light laser and an ultraviolet light laser; and a transmission member disposed on an outer-surface side of a vehicle, the transmission member being adapted to let visible light pass therethrough, and to receive ultraviolet light and emit light by itself, the program being adapted to cause the light output apparatus for vehicle to perform: an input step of receiving vehicle information about the vehicle; and a projection step of scanning the visible light laser and the ultraviolet light laser, and projecting the visible light laser and the ultraviolet light laser onto the transmission member, in which in the projection step, based on the vehicle information input in the input step, first information is shown by projecting the ultraviolet light laser onto the transmission member and thereby making the transmission member emit light, and the visible light laser is projected onto the transmission member and second information is thereby projected onto a surface which the visible light laser reaches after passing through the transmission member.

DETAILED DESCRIPTION

First Embodiment

Figure 1:
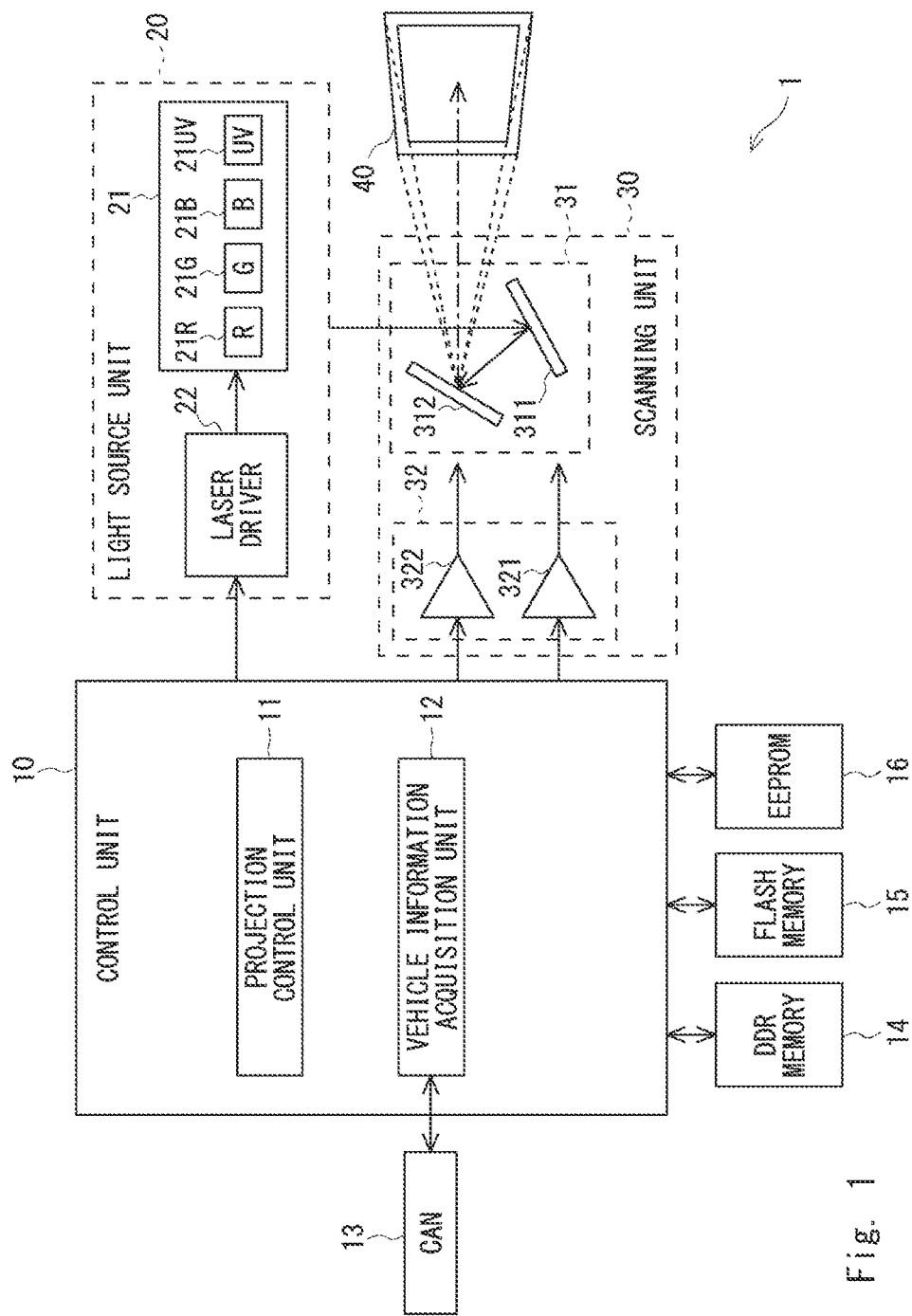
FIG. 1 is a block diagram showing an example of a configuration of a light output apparatus for vehicle according to a first embodiment.

A light output apparatus for vehicle according to this embodiment will be described with reference to FIGS. 1 and 2. FIG. 1 is a block diagram showing an example of a configuration of the light output apparatus for vehicle according to this embodiment.

As shown in FIG. 1, the light output apparatus for vehicle (the light output apparatus for vehicle use) 1 according to this embodiment may include a control unit 10, a light source unit (a laser light source unit) 20, a scanning unit (a scanner unit) 30, and a transmission member 40.

The control unit 10 is a part that controls the light source unit 20 and the scanning unit 30, and may include a projection control unit 11 and a vehicle information acquisition unit 12 for the control of them. The projection control unit 11 is a part that controls projection of laser light performed by the light source unit 20 and the scanning unit 30, and can be referred to as a laser light control unit. The vehicle information acquisition unit 12 acquires vehicle information about a vehicle from the main body side of the vehicle. Therefore, the vehicle information acquisition unit 12 may be connected to the main body side of the vehicle through, for example, a CAN (Controller Area Network) 13.

As will be described later, the vehicle information is used for control performed by the projection control unit 11. The vehicle information is information about the vehicle. In particular, the vehicle information may be information that people or the like present around the vehicle need to be notified about or information equivalent to such information, and may be information input from the vehicle side such as a vehicle control unit that controls the vehicle. Note that although the vehicle information acquisition unit 12 may be configured to periodically request and acquire vehicle information from the vehicle side, it is preferably configured to simply receive vehicle information transmitted from the vehicle side.

The light output apparatus for vehicle 1 may include, as a part of the control unit 10 or outside the control unit 10, a DDR (Double Data Rate) memory 14, a flash memory 15, and an EEPROM 16. Note that the EEPROM stands for Electrically Erasable and Programmable Read Only Memory.

The control unit 10 can be formed by a processor such as a CPU (Central Processing Unit). That is, the control unit 10 can have a function as a computer. The control unit 10 can perform various processes by executing a program(s) stored in, for example, a storage device such as the flash memory 15. Further, the control unit 10 implements functions of components such as the projection control unit 11 and the vehicle information acquisition unit 12 by executing the program(s).

The DDR memory 14 is an example of a frame buffer that temporarily stores image data. The DDR memory 14 may be a DDR2, a DDR3, or other types of an SDRAM (Synchronous Dynamic Random Access Memory). The flash memory 15 and the EEPROM 16 are examples of nonvolatile storage units that store data and programs necessary for the operations performed by the control unit 10. The control unit 10 generates, for example, a drive signal for operating a scanner driver 32 (which will be described later). The EEPROM 16 is an example of a nonvolatile storage unit that stores data necessary for the above-described operation for generating the drive signal.

Note that each of the components of the control unit 10 is not limited to those implemented by a program, and may be implemented by hardware, a combination of hardware and a program, or the like. Further, each of the components of the control unit 10 may be implemented by using an integrated circuit that can be programmed by a user, such as an FPGA (field-programmable gate array) or a microcomputer. As described above, the control unit 10 may implement the function of each of the components of the control unit 10 by using the integrated circuit.

The light source unit 20 emits visible light lasers and an ultraviolet light laser. Therefore, the light source unit 20 may include, as light sources, laser diodes 21 that output visible light lasers and an ultraviolet light laser, and a laser driver 22. The laser diodes 21 can be formed by a red laser diode 21R, a green laser diode 21G, a blue laser diode 21B, and an ultraviolet light laser diode 21UV. However, the configuration of the laser diodes 21 is not limited to the above-described configuration. For example, a combination of colors of visible light lasers may be changed. For example, the laser diodes 21 may be configured so as to output only an ultraviolet light laser and a visible light laser of one color, may include a laser diode(s) that outputs a laser(s) of another color(s), or may include a plurality of laser diodes that output ultraviolet light lasers.

The laser driver 22 can drive the laser diodes 21 under the control of the projection control unit 11. For example, the laser driver 22 drives each of the laser diodes included in the laser diodes 21 at a lighting timing with a driving current based on the control of the projection control unit 11.

Further, the light source unit 20 may include an optical system that combines laser light output from each of the red laser diode 21R, the green laser diode 21G, the blue laser diode 21B, and the ultraviolet light laser diode 21UV. This optical system may be formed by, for example, a plurality of dichroic mirrors. Further, the light source unit 20 may include a mirror(s) for guiding the laser light, which is combined as described above, to a scanning mirror unit 31 (which will be described later). In this way, it is possible to apply the laser light emitted from the light source unit 20 to the scanning mirror unit 31.

The scanning unit 30 scans the visible light lasers and the ultraviolet light laser emitted from the light source unit 20, and projects the visible light lasers and the ultraviolet light laser onto the transmission member 40. Therefore, the scanning unit 30 may include the scanner driver 32 and the scanning mirror unit 31. The visible light lasers can be output from the red laser diode 21R, the green laser diode 21G, and the blue laser diode 21B. Meanwhile, the ultraviolet light laser can be output from the ultraviolet light laser diode 21UV.

The scanning mirror unit 31, which is driven by the scanner driver 32, reflects the laser light emitted from the light source unit 20 and scans the reflected laser light on the transmission member (light transmission member) 40 which serves as a screen. The scanning mirror unit 31 may include a horizontal scanning mirror 311 that reflects the laser light and scans the reflected laser light on the transmission member 40 in the horizontal direction, and a vertical scanning mirror 312 that reflects the laser light and scans the reflected laser light on the transmission member 40 in the vertical direction. Each of the horizontal and vertical scanning mirrors 311 and 312 may be formed by a scanning mirror such as a MEMS (Micro Electro Mechanical System).

The scanner driver 32 operates the scanning mirrors constituting the scanning mirror unit 31 under the control of the projection control unit 11. The scanner driver 32 may include a horizontal scanner driver 321 that operates the horizontal scanning mirror 311 and a vertical scanner driver 322 that operates the vertical scanning mirror 312. The horizontal scanner driver 321 supplies a driving voltage for oscillating the horizontal scanning mirror 311 at a predetermined frequency to the horizontal scanning mirror 311 under the control of the projection control unit 11. The vertical scanner driver 322 supplies a driving voltage for oscillating the vertical scanning mirror 312 at a predetermined frequency to the vertical scanning mirror 312 under the control of the projection control unit 11.

Note that, in the above descriptions, the optical path of the laser light output from the light source unit 20 is configured so that the laser light is first scanned by the horizontal scanning mirror 311 and then scanned by the vertical scanning mirror 312. However, the optical path is not limited to such a configuration. The order of scanning operations performed by the horizontal and vertical scanning mirrors 311 and 312 may be reversed. Further, the horizontal and vertical scanning mirrors 311 and 312 may be integrated with each other.

Next, the transmission member 40 and the output of light using it, which are one of the main features of this embodiment, will be described.

The transmission member 40 is a member disposed on the outer-surface side of the vehicle. The transmission member 40 lets visible light pass therethrough, and receives ultraviolet light and emits light by itself. The transmission member 40 is not limited to a planar member, and may be a 3D (three dimensional) member. The scanning performed by the scanning unit 30 may be 2D (two dimensional) scanning as described above, and by this 2D scanning, the laser light is eventually projected onto the surface on the rear side (the inside of the vehicle) of the transmission member 40. In order to make the transmission member 40 emit light by itself, a light emitting material such as a fluorescent substance that emits light in response to ultraviolet light may be contained in the whole transmission member 40 or a part thereof that needs to be made to emit light by itself. The transmission member 40 may have a structure in which a fluorescent substance that emits light in response to ultraviolet light is sandwiched as an intermediate film between members that are made of a material, such as resin and glass, that lets visible light pass therethrough.

Further, the projection control unit 11 performs, based on vehicle information, control to show first information by projecting an ultraviolet light laser onto the transmission member 40 (or onto a part thereof) and thereby making the transmission member 40 emit light (emit light by itself). Further, for example, it is possible, by containing a light emitting material in the inside of the entire surface of the transmission member 40 or the inside of an arbitrary area thereof, to show the first information formed by planes and/or lines (which may be a still image or a moving image) in an arbitrary area within a range in which the scanning unit 30 can scan the laser light. Needless to say, the first information can be displayed on the entire surface of the transmission member 40.

While performing the above-described control for the first information, the projection control unit 11 also performs, based on vehicle information, control to project a visible light laser onto the transmission member 40 (or onto a part thereof) and thereby project second information onto a road surface or the like where the visible light laser reaches after passing through the transmission member 40. Note that the projection control unit 11 may be configured so as to perform the control for projecting the second information by the visible light laser based on vehicle information different from the vehicle information based on which the control for the first information is performed. Further, although the projection control unit 11 performs the above-described control in the above explanation, the only requirement is that the control unit 10 can perform the above-described control. The surface onto which the second information is projected by the visible light laser is a surface on which the visible light laser that has passed through the transmission member 40 is incident, and is set so that the surface is, for example, located below the vehicle and about 1 to 2 m away from the vehicle. Therefore, the surface on which the visible light laser is incident is not limited to the road surface. However, embodiments described below will be described on the assumption that the surface on which the visible light laser is incident is the road surface.

Further, the projection control unit 11 may perform control so that the first and second information are alternately projected. When the first information is shown by projecting the ultraviolet light laser on the transmission member 40 and thereby making the transmission member 40 emit light, the transmittance of visible light in the light emitting part of the transmission member 40 may be lowered. Therefore, the projection control unit 11 preferably projects the first and second information in an alternating manner at such a frequency that the blinking is not recognized by human eyes or at such a frequency that the blinking is not synchronized with a camera that takes images at a predetermined frame rate. Specifically, for example, the projection control unit 11 alternately projects the first and second information at 120 Hz, or at 108 Hz which is not equal to an integral multiple of the frequency of the commercial power supply.

Further, the projection control unit 11 may adjust the output intensity of the visible light laser, which passes through the range in which the transmission member 40 emits light by the projection of the first information and shows the second information, according to the decrease in the transmittance in the light emitting part of the transmission member 40. Further, the projection control unit 11 may change the output intensity of the visible light laser that shows the second information and/or the color of the emitted light based on the brightness around the vehicle.

Note that the vehicle information can be acquired by the vehicle information acquisition unit 12 as described above, and the vehicle information acquisition unit 12 may pass the acquired vehicle information to the projection control unit 11. The projection control unit 11 can show the first information and project the second information onto the road surface by controlling the laser driver 22 of the light source unit 20 and the scanner driver 32 of the scanning unit 30 based on the aforementioned vehicle information.

Next, data based on which the first and second information are created will be described.

Image data that is stored in advance so that the projection control unit 11 can read it can be used to display the first information. The above-described DDR memory 14 may be a frame buffer that temporarily stores image data that will be shown by the ultraviolet light laser. Further, the projection control unit 11 can control the lighting of the ultraviolet light laser so that the image data stored in the frame buffer can be depicted on the transmission member 40.

Further, when image data whose shape is different from that of the transmission member 40 (in actuality, from the shape of the area in the transmission member 40 in which a light emitting material is contained) is depicted on the transmission member 40 by the ultraviolet light laser, this image data may be temporarily stored in the DDR memory 14. As described above, the lighting of the ultraviolet light laser can be performed as the projection control unit 11 controls the laser driver 22 and thereby drives the ultraviolet light laser diode 21UV.

For the image data that shows the second information, data that is stored in advance so that the projection control unit 11 can read it can be used. The above-described DDR memory 14 may be a frame buffer that temporarily stores image data that will be displayed by the visible light laser. Further, the projection control unit 11 can control the lighting of the visible light laser so that the image data stored in the frame buffer can be depicted on the road surface. As described above, the lighting of the visible light laser can be performed as the projection control unit 11 controls the laser driver 22 and thereby drives at least one of the red laser diode 21R, the green laser diode 21G, and the blue laser diode 21B.

Note that the original image data that will be read into the DDR memory 14 may be data of a still image or data of a moving image (video data), and may be stored so that it can be read into the flash memory 15 by a program or stored as a part of a program. This feature also applies to the image data for either of the first and second information.

In particular, the second information is information based on the same vehicle information as that for the first information, but may be information expressed by text or figures of a type different from that of the first information. That is, the second information projected onto the road surface may be one that is essentially the same as the first information but is expressed in a different displaying form. Further, the second information projected onto the road surface may be information that complements the first information.

Next, a more specific example of a display will be described with reference to FIG. 2. FIG. 2 is a schematic diagram showing an example of an image (image of video) projected from a vehicle equipped with the light output apparatus for vehicle 1. As shown in FIG. 2, a transmission member 40 in this embodiment can include a member that is provided in the vehicle 4 as a blinker lens 41 that receives ultraviolet light and emits a blinker representing color. Note, as described above as the transmission member 40, the blinker lens 41 also serves as a member that lets visible light pass therethrough.

In this case, the projection control unit 11 emits an ultraviolet light laser in accordance with a blinker light-emitting pattern for showing the emitted light as the first information based on blinker instruction information that serves as the vehicle information. Further, while performing above-described light-emitting control, the projection control unit 11 emits a visible light laser so as to project a warning video (warning image) corresponding to the blinker operation as the second information based on the above-described blinker instruction information. The projection control unit 11 may perform control so as to emit the ultraviolet light laser and the visible light laser at least during the period during which the blinker is operated.

The warning video corresponding to the blinker operation can be displayed on the road surface by making the laser light pass through the blinker lens 41 (or the whole transmission member 40 of a part thereof). As shown in FIG. 2, the warning video corresponding to the blinker operation may be, for example, a video indicating a direction in which the vehicle 4 will travel (e.g., a warning image 51). Note that the blinker lens 41 and the warning image 51 are examples for a right turn. In the case of the example shown in FIG. 2, a display control signal for displaying a right blinker indicating a right turn can be used as the blinker instruction information.

The light-emitting pattern of the blinker for the first information may be a simple blinking pattern or a predetermined light-emitting pattern. For example, in the case of a right turn, the light-emitting pattern may be a light-emitting pattern in which a light-emitting area moves from the left side to the right side. Further, the warning image (warning video) shown as the warning image 51 can also be a video of a predetermined light-emitting pattern. As a more typical example, the warning image (warning video) may not be a video in which the warning image 51 is continuously displayed, but may be a video in which the warning image 51 is blinked at regular intervals. The video using the warning image 51 is an example of information that is expressed by text or figures of a type different from that of the blinker light-emitting pattern for the first information. However, needless to say, the warning video corresponding to the blinker operation is not limited to the video using the warning image 51 shown in the drawing, and may be the same video as the blinker light-emitting pattern for the first information.

Although the right blinker is described above as an example, the same applies to a left blinker that indicates a change of the traveling direction to the left such as a left turn. In this case, the light output apparatus for vehicle 1 can be provided on each of the left and right sides of the vehicle. However, except for the blinker lens, common parts can be used for both the left and right sides. For example, a common control unit 10 can be used for both the left and right sides, and a light source unit 20 and a scanning unit 30 may be provided for each of the left and right sides. Alternatively, a common control unit 10, a common light source unit 20, and a common scanning unit 30 may be used for both the left and right sides, and the mirror of the scanning mirror unit 31 may be configured to be movable so that the optical path is switched to either of the left and right transmission members 40. In this case, the projection unit 11 may control the switching of the optical path for the scanning unit 30 according to whether a display control signal input to the vehicle information acquisition unit 12 is a signal for displaying the right blinker or a signal for displaying the left blinker.

Further, a blinker lens may be provided in, for example, each of the front, the rear, and the middle therebetween (e.g., in or near a side mirror). Further, in such a case, the light output apparatus for vehicle 1 may be separately provided for each of them, or parts of them may be configured as a common part.

Further, in the light output apparatus for vehicle 1, the lighting apparatus of the vehicle and the road-surface projection apparatus thereof can be formed by using a common transmission member 40. Therefore, according to the light output apparatus for vehicle 1 in accordance with this embodiment, it is possible, when a vehicle is equipped with a function of projecting information onto a road surface or the like as well as a lighting function, to reduce the weight and the installation space in the vehicle as much as possible. Further, in the light output apparatus for vehicle 1, it is possible to form the light source of the lighting apparatus of the vehicle and the light source of the road-surface projection apparatus by using one light source unit 20, and thereby to use a part of the laser driver 22 and the like for both the visible light and the ultraviolet light. From this point, it can also be considered that the light output apparatus for vehicle 1 can reduce the weight and the installation space in the vehicle as much as possible.

In particular, in the light output apparatus for vehicle 1 according to this embodiment, it is possible to indicate a change of the traveling direction by the blinker light and display a warning video corresponding to the blinker operation, and thereby to be more strongly warned to people or the like around the vehicle 4 about the change of the traveling direction.

Second Embodiment

Figure 3:
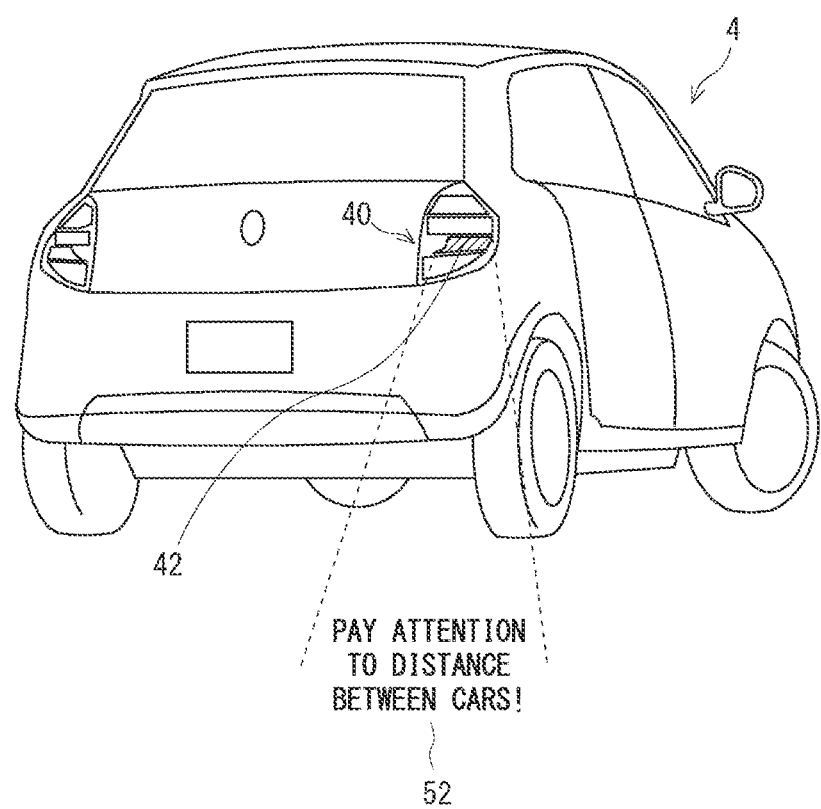
FIG. 3 is a schematic diagram showing an example of an image projected from a vehicle equipped with a light output apparatus for vehicle according to a second embodiment.

A light output apparatus for vehicle according to a second embodiment will be described with reference to FIG. 3 as well as other drawings. FIG. 3 is a schematic diagram showing an example of an image (image of video) projected from a vehicle equipped with a light output apparatus for vehicle according to this embodiment. In principle, the light output apparatus for vehicle according to this embodiment may include the same configuration as that described above with reference to FIG. 1, and hence this embodiment will also be described based on the configuration of the light output apparatus for vehicle 1. In principle, various examples described in the first embodiment can also be applied to this embodiment.

In the first embodiment, an example in which the light output apparatus for vehicle 1 is used as the blinker of the vehicle 4 is mainly described. In contrast, in the second embodiment, an example in which the light output apparatus for vehicle 1 is used as a brake light will be described.

As shown in FIG. 3, a transmission member 40 in this embodiment can include a member that is provided in a vehicle 4 as a brake light lens 42 that receives ultraviolet light and emits a brake representing color. Note, as described above as the transmission member 40, the brake light lens 42 also serves as a member that lets visible light pass therethrough.

In this case, the projection control unit 11 emits an ultraviolet light laser in accordance with brake operation state information for showing the emitted light as the first information based on brake operation information that serves as the vehicle information. As the brake operation information, a brake control signal for performing a braking operation can be used. The brake operation state information means operation state information indicating whether or not a brake operation is performed (i.e., information indicating the state of the brake operation), and the above-described brake control signal can be used as it is as the brake operation state information.

Further, while performing above-described light-emitting control, the projection control unit 11 emits a visible light laser so as to project a warning video corresponding to the brake operation as the second information based on the above-described brake operation information. The projection control unit 11 may perform control so as to emit an ultraviolet light laser and a visible light laser at least during a brake operation period (a period during which the vehicle 4 performs a braking operation).

The warning video corresponding to the brake operation can be displayed on the road surface by making the laser light pass through the brake light lens 42 (or whole or part of the transmission member 40). As shown in FIG. 3, the warning video corresponding to the brake operation may be a video indicating a stop or a deceleration. For example, the warning video may be a warning image 52 including text "Pay attention to distance between cars!".

The brake operation state information for the first information may be a predetermined light-emitting pattern, such as a pattern in which the light is blinked at predetermined intervals during the period during which the brake operation is performed. Further, the warning video shown as the warning image 52 can also be a video of a predetermined light-emitting pattern. As a more typical example, the warning video may not be a video in which the warning image 52 is continuously displayed, but may be a video in which the warning image 52 is blinked at regular intervals. The video using the warning image 52 is an example of information that is expressed by text or figures of a type different from that of the brake operation state information for the first information. However, needless to say, the warning video corresponding to the brake operation is not limited to the video using the warning image 52 shown in the drawing, and may be the same video as the light-emitting pattern for the first information.

Further, it is also possible to determine whether or not the braking is a sudden braking based on the operation state of the driver (the strength or the like of the braking) on the main body side of the vehicle 4 or the control unit 10 side, and the control unit 10 switches the displayed image between an image indicating a stop and an image indicating a deceleration according to the determined operation state of the driver.

Although the brake light on the right side is shown as an example in FIG. 3, the same applies to a brake light on the left side. In this case, the light output apparatus for vehicle 1 can be provided on each of the left and right sides of the vehicle. However, except for the brake light lens, common parts can be used for both the left and right sides. For example, a common control unit 10 can be used for both the left and right sides, and a light source unit 20 and a scanning unit 30 may be provided for each of the left and right sides. Alternatively, a common control unit 10, a common light source unit 20, and a common scanning unit 30 may be used for both the left and right sides, and the scanning mirror unit 31 may be equipped with a beam splitter or the like and configured so that the optical path is switched to either of the brake light lens on the left side and that on the right side.

Further, the image data for the warning video corresponding to the brake operation may be, for example, image data based on which a plurality of visible light lasers are emitted from a plurality of transmission members such as from both the right brake light lens 42 and the left brake light lens in such a manner that one video is formed by these visible light lasers.

Further, the brake light lens may be disposed in other parts of the vehicle such as a rear wing attached to the vehicle. In such a case, the light output apparatus for vehicle 1 may be separately provided for each of them, or parts of them may be configured as a common part.

As can be understood from the above descriptions, according to the light output apparatus for vehicle 1 in accordance with this embodiment, the weight and the installation space in the vehicle can be reduced as much as possible as in the case of the light output apparatus for vehicle 1 according to the first embodiment. In particular, in the light output apparatus for vehicle 1 according to this embodiment, it is possible to show whether or not braking is performed by using the brake light and display a warning video corresponding to the brake operation, and thereby to be more strongly warned to people or the like around the vehicle 4 as to whether or not the braking operation is performed.

Third Embodiment

Figure 4:
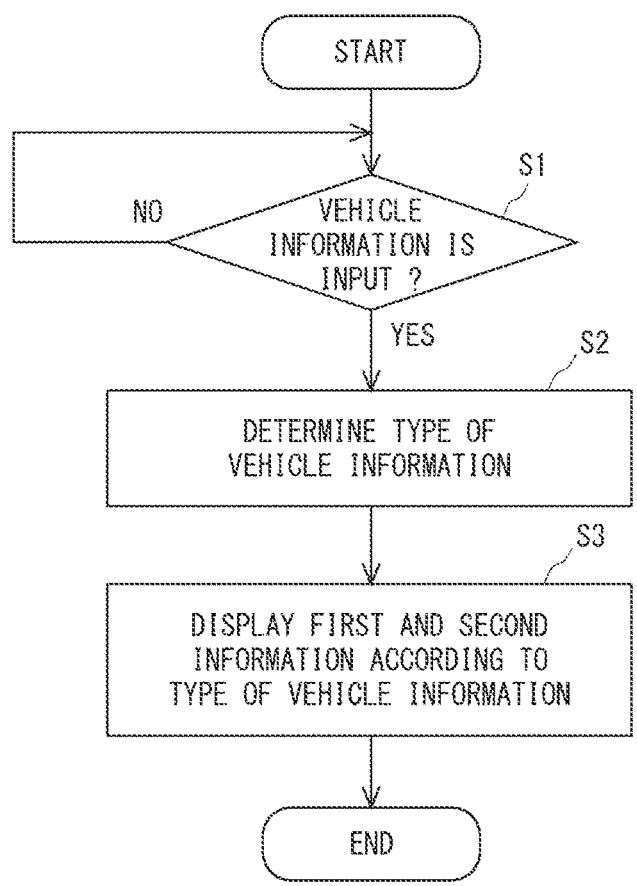
FIG. 4 is a flowchart for explaining an example of processes performed in a light output apparatus for vehicle according to a third embodiment.

In the first and second embodiments, examples in which the light output apparatus for vehicle 1 are used as a blinker and a brake light, respectively, of the vehicle 4 are shown. As a third embodiment, an example in which a light output apparatus for vehicle 1 is used as both a blinker and a brake light will be described with reference to FIG. 4 as well as other drawings. FIG. 4 is a flowchart for explaining an example of processes performed in a light output apparatus for vehicle according to this embodiment. In principle, the light output apparatus for vehicle according to this embodiment may include the same configuration as that described above with reference to FIG. 1, and hence this embodiment will also be described based on the configuration of the light output apparatus for vehicle 1. In principle, various examples described in the first and second embodiments can also be applied to this embodiment.

Firstly, the vehicle information acquisition unit 12 determines whether or not vehicle information has been input (step S1). Then, when the vehicle information has been input, the vehicle information acquisition unit 12 outputs the input vehicle information to the projection control unit 11. The projection control unit 11 determines the type of the input vehicle information (step S2). In the step S2, it is determined whether the input vehicle information is a display control signal indicating a change of the traveling direction to the right (a right-turn signal), a display control signal indicating a change of the traveling direction to the left (a left-turn signal), or a brake control signal.

The projection control unit 11 controls the laser driver 22 and the scanner driver 32 so as to display first and second information according to the type of the input vehicle information (step S3). Specifically, when it is determined that the right-turn signal is input, the projection control unit 11 emits an ultraviolet light laser to the blinker lens 41 in accordance with a blinker light-emitting pattern. While performing above-described light-emitting control, the projection control unit 11 emits a visible light laser so as to project a video indicating a direction in which the vehicle 4 will travel (a rightward direction) (e.g., a warning image 51) onto the road surface.

Similarly, when it is determined that the left-turn signal is input, the projection control unit 11 emits an ultraviolet light laser to the blinker lens on the left side in accordance with a blinker light-emitting pattern. While performing above-described light-emitting control, the projection control unit 11 emits a visible light laser so as to project a video indicating a direction in which the vehicle 4 will travel (a leftward direction) onto the road surface.

When it is determined that the brake control signal is input, the projection control unit 11 emits an ultraviolet light laser to the right brake light lens 42 and the left brake light lens in accordance with this brake control signal. While performing above-described light-emitting control, the projection control unit 11 emits a visible light laser to the right brake light lens 42 and the left brake light lens at the same time or in a divided manner so as to project a warning video corresponding to the brake operation (e.g., the warning image 52).

Figure 2:
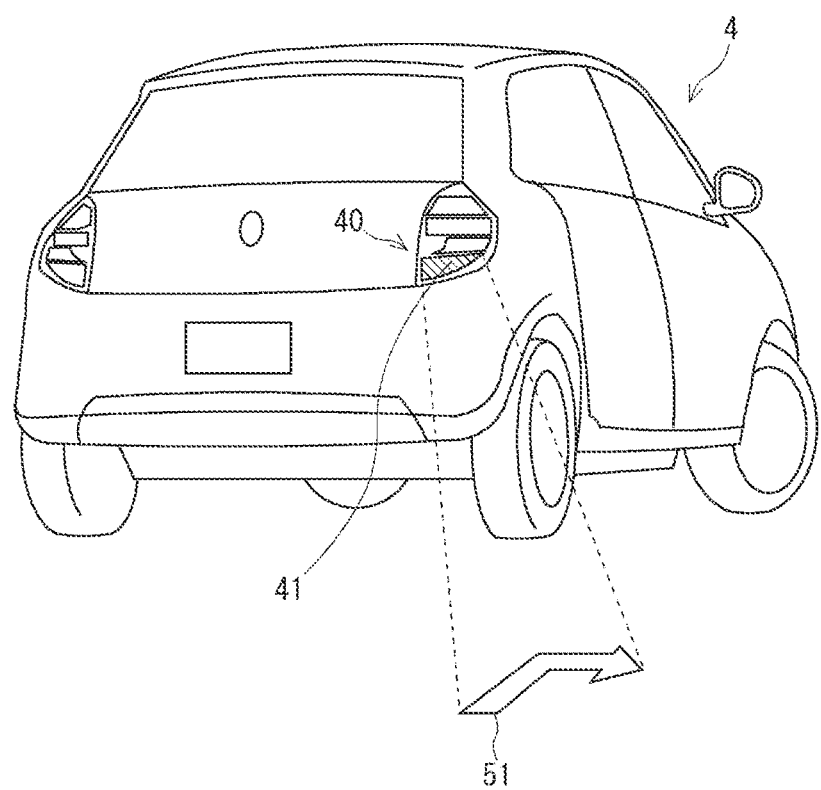
FIG. 2 is a schematic diagram showing an example of an image projected from a vehicle equipped with the light output apparatus for vehicle according to the first embodiment.

Further, although the explanation is made with reference to FIGS. 2 and 3 on the assumption that the blinker lens 41 and the brake light lens 42 are separate lenses, a common lens may be used for both of them, and a change of the traveling direction and a brake operation may be separately displayed by using different image data. In this case, the common lens includes a section where light having a blinker representing color is emitted and a section where light having a brake representing color, both of which are emitted by the projection of an ultraviolet light laser.

As can be understood from the above description, according to this embodiment, it is possible to provide a light output apparatus for vehicle that achieve the effects of both the first and second embodiments.

Other Embodiments

In the first to third embodiments, the function of each part of the light output apparatus for vehicle 1 shown in FIG. 1 is described. However, the only requirement is that these functions can be implemented as those of the light output apparatus for vehicle 1. Note that although the first to third embodiments are described on the assumption that the vehicle in which the light output apparatus for vehicle 1 is provided is an automobile, the light output apparatus for vehicle 1 may be provided in other types of vehicles such as a bicycle and a motorcycle. Further, although the vehicle information for the change of the traveling direction and the brake operation is used as an example, the present invention can also be applied to the cases where other types of vehicle information are used.

Further, in the operations in the first to third embodiments, for example, when it is detected that there is another vehicle behind the vehicle 4, detection information about that may be input as vehicle information and control may be performed so as to project second information. The other vehicle is detected by preforming a process for recognizing a vehicle from a radar device (not shown) or an image taken by a camera. Further, the other vehicle to be detected includes a bicycle and the like as well as an automobile. Further, when it is determined that the detected other vehicle is located within a predetermined distance, e.g., within 10 m, from the vehicle 4, determination information about that may be input as vehicle information and control may be performed so as to project second information. Note that the detection information and the determination information described above can be regarded as accident prevention information for preventing an accident of the vehicle 4 because it may prevent a collision or the like of the other vehicle with the vehicle 4. Therefore, they can be included in the category of the vehicle information.

Note that as will be understood from the descriptions of the first to third embodiments, the light output apparatus for vehicle 1 can be considered to be an apparatus that functions as an image display apparatus. Further, since the light output apparatus for vehicle 1 can notify a user or the like of first and second information, it can also be referred to as an information notification apparatus or an information reporting apparatus.

Figure 5:
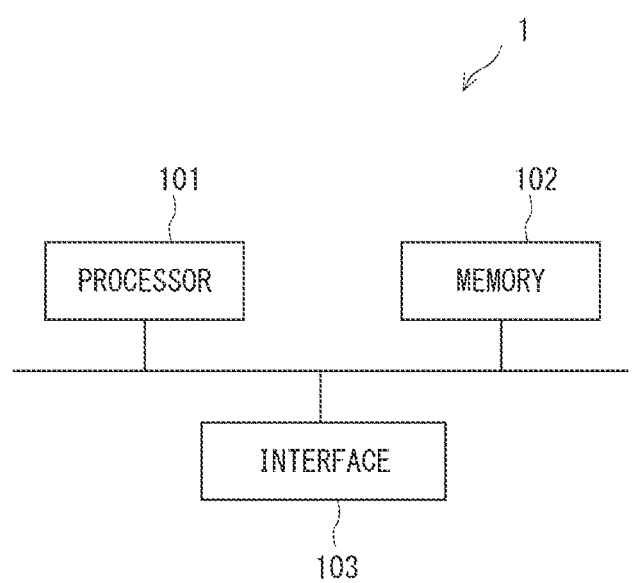
FIG. 5 shows an example of a hardware configuration included in a light output apparatus for vehicle.

Further, the light output apparatus for vehicle 1 according to the first to third embodiments may have a hardware configuration described below. FIG. 5 is a diagram showing an example of a hardware configuration included in the light output apparatus for vehicle 1.

The light output apparatus for vehicle 1 shown in FIG. 5 includes interfaces 103 such as an interface for the CAN 13, an interface for the light source unit 20, and an interface for the scanning unit 30, and a processor 101 and a memory 102. The control unit 10 described in each of the above-described embodiments is implemented as the processor 101 loads and executes a control program(s) stored in the memory 102. That is, the control program is a program for causing the processor 101 to function as the control unit 10 shown in FIG. 1. This control program can be regarded as a program for causing the light output apparatus for vehicle 1 shown in FIG. 1 to execute the processes performed in the control unit 10.

The above-described program can be stored and provided to a computer (a computer including a light output apparatus for vehicle use) using any type of non-transitory computer readable media. Non-transitory computer readable media include any type of tangible storage media. Examples of non-transitory computer readable media include magnetic storage media (such as floppy disks, magnetic tapes, hard disk drives, etc.), and optical magnetic storage media (e.g. magneto-optical disks). Further, the examples include CD-ROM (Read Only Memory), CD-R, and CD-R/W. Further, the examples include semiconductor memories (such as mask ROM, PROM (Programmable ROM), EPROM (Erasable PROM), flash ROM, RAM (Random Access Memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, as the procedure for processes performed in the light output apparatus for vehicle is described in the above-described various embodiments, the present invention may be implemented as a light output method performed in a light output apparatus for vehicle including a light source unit and a transmission member. This light output method may also be referred to as a reporting method or an information displaying method. The information displaying method includes an input step and a projection step described below. The aforementioned input step is a step of inputting vehicle information about a vehicle. The aforementioned projection step is a step of scanning a visible light laser and an ultraviolet light laser, and projecting the visible light laser and the ultraviolet light laser onto the transmission member. Further, in the above-described projection step, based on the vehicle information input in the input step, first information is shown by projecting the ultraviolet light laser onto the transmission member and thereby making the transmission member emit light. In the above-described projection step, while the first information is shown, the visible light laser is projected onto the transmission member and second information is thereby projected onto a surface which the visible light laser reaches after passing through the transmission member. Note that other examples are the same as those described in the above-described various embodiments. Further, the aforementioned control program is considered to be a program for causing the light output apparatus for vehicle (e.g., a control unit of the light output apparatus for vehicle) to execute such a light output method.

Note that the present invention is not limited to the above-described embodiments and they can be modified as appropriate without departing from the spirit and scope of the invention. Further, the present invention may be implemented by combining these embodiments as desired.

A light output apparatus for vehicle, a light output method, and a program according to an embodiment are used for a vehicle, and when the vehicle is equipped with a function of projecting information onto a road surface or the like as well as a lighting function, can reduce the weight and the installation space in the vehicle as much as possible. Therefore, they are industrially applicable.

What is claimed is:

1. A light output apparatus for vehicle comprising:
   a light source unit configured to emit a visible light laser and an ultraviolet light laser;
   a scanning unit configured to scan the visible light laser and the ultraviolet light laser emitted from the light source unit;
   a control unit configured to control the light source unit and the scanning unit; and
   a transmission member disposed on an outer-surface side of a vehicle, the transmission member being adapted to let visible light pass therethrough, and to receive ultraviolet light and emit light by itself, wherein
   the scanning unit scans the visible light laser and the ultraviolet light laser, and projects the visible light laser and the ultraviolet light laser onto the transmission member, and
   the control unit performs control, based on vehicle information about the vehicle, to show first information by projecting the ultraviolet light laser onto the transmission member and thereby making the transmission member emit light, and to project the visible light laser onto the transmission member and thereby project second information onto a surface which the visible light laser reaches after passing through the transmission member.

2. The light output apparatus for vehicle according to claim 1, wherein the second information is information expressed by text or a figure of a type different from that of the first information.

3. The light output apparatus for vehicle according to claim 1, wherein
   the transmission member includes a member provided in the vehicle as a blinker lens that receives ultraviolet light and emits light having a blinker representing color, and
   the control unit emits the ultraviolet light laser in accordance with a blinker light-emitting pattern for showing the emitted light as the first information and emits the visible light laser so as to project a warning video corresponding to a blinker operation as the second information based on blinker instruction information that serves as the vehicle information.

4. The light output apparatus for vehicle according to claim 3, wherein the warning video corresponding to the blinker operation is a video indicating a direction in which the vehicle will travel.

5. The light output apparatus for vehicle according to claim 1, wherein
   the transmission member includes a member provided in the vehicle as a brake light lens that receives ultraviolet light and emits light having a brake representing color, and
   the control unit emits the ultraviolet light laser in accordance with brake operation state information for showing the emitted light as the first information and emits the visible light laser so as to project a warning video corresponding to a brake operation as the second information based on brake operation information that serves as the vehicle information.

6. The light output apparatus for vehicle according to claim 5, wherein the warning video corresponding to the brake operation is a video indicating a stop or a deceleration.

7. A light output method performed in a light output apparatus for vehicle,
   the light output apparatus for vehicle comprising:
   a light source unit configured to emit a visible light laser and an ultraviolet light laser; and
   a transmission member disposed on an outer-surface side of a vehicle, the transmission member being adapted to let visible light pass therethrough, and to receive ultraviolet light and emit light by itself,
   the light output method comprising:
   an input step of receiving vehicle information about the vehicle; and
   a projection step of scanning the visible light laser and the ultraviolet light laser, and projecting the visible light laser and the ultraviolet light laser onto the transmission member, wherein
   in the projection step, based on the vehicle information input in the input step, first information is shown by projecting the ultraviolet light laser onto the transmission member and thereby making the transmission member emit light, and the visible light laser is projected onto the transmission member and second information is thereby projected onto a surface which the visible light laser reaches after passing through the transmission member.

8. A non-transitory computer readable medium storing a program for a light output apparatus for vehicle, the light output apparatus for vehicle comprising:

a light source unit configured to emit a visible light laser and an ultraviolet light laser; and a transmission member disposed on an outer-surface side of a vehicle, the transmission member being adapted to let visible light pass therethrough, and to receive ultraviolet light and emit light by itself, the program being adapted to cause the light output apparatus for vehicle to perform:

an input step of receiving vehicle information about the vehicle; and a projection step of scanning the visible light laser and the ultraviolet light laser, and projecting the visible light laser and the ultraviolet light laser onto the transmission member, wherein in the projection step, based on the vehicle information input in the input step, first information is shown by projecting the ultraviolet light laser onto the transmission member and thereby making the transmission member emit light, and the visible light laser is projected onto the transmission member and second information is thereby projected onto a surface which the visible light laser reaches after passing through the transmission member.

* * * * *